United States Patent
Matsugami et al.

(10) Patent No.: US 12,124,337 B2
(45) Date of Patent: Oct. 22, 2024

(54) STORAGE SYSTEM AND STORAGE CONTROL METHOD

(71) Applicant: Hitachi, Ltd., Tokyo (JP)

(72) Inventors: Kazuki Matsugami, Tokyo (JP);
Tomohiro Yoshihara, Tokyo (JP);
Takashi Nagao, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 89 days.

(21) Appl. No.: 18/119,147

(22) Filed: Mar. 8, 2023

(65) Prior Publication Data
US 2024/0176707 A1 May 30, 2024

(30) Foreign Application Priority Data
Nov. 30, 2022 (JP) .................. 2022-191738

(51) Int. Cl.
*G06F 11/00* (2006.01)
*G06F 3/06* (2006.01)
*G06F 11/14* (2006.01)
*G06F 11/16* (2006.01)

(52) U.S. Cl.
CPC ........ *G06F 11/1464* (2013.01); *G06F 3/0619* (2013.01); *G06F 3/0653* (2013.01); *G06F 3/0673* (2013.01); *G06F 11/1458* (2013.01); *G06F 11/1662* (2013.01); *G06F 2201/84* (2013.01)

(58) Field of Classification Search
CPC ............. G06F 11/1458; G06F 11/1464; G06F 11/1662; G06F 2201/84
See application file for complete search history.

(56) References Cited

U.S. PATENT DOCUMENTS

| | | | | |
|---|---|---|---|---|
| 8,949,559 | B2* | 2/2015 | Tanaka ................ | G06F 3/065 |
| | | | | 711/170 |
| 10,452,296 | B1* | 10/2019 | Greenwood ........... | G06F 3/065 |
| 10,909,001 | B1* | 2/2021 | Kucherov ........... | G06F 11/1458 |
| 10,963,485 | B1 | 3/2021 | Matsushita et al. | |
| 11,853,585 | B2* | 12/2023 | Ward .................. | G06F 11/1469 |
| 11,966,301 | B2* | 4/2024 | Wu ..................... | G06F 11/0727 |
| 2005/0210210 | A1* | 9/2005 | Arai .................... | G06F 11/2074 |
| | | | | 714/E11.12 |
| 2008/0320219 | A1* | 12/2008 | Okada ................ | G06F 11/2064 |
| | | | | 711/E12.001 |
| 2012/0311261 | A1* | 12/2012 | Mizuno ............... | G06F 3/065 |
| | | | | 711/E12.017 |
| 2019/0339871 | A1* | 11/2019 | Kucherov ............. | G06F 3/067 |
| 2022/0229806 | A1* | 7/2022 | Copley ................ | G06F 3/065 |

(Continued)

*Primary Examiner* — Joshua P Lottich
(74) *Attorney, Agent, or Firm* — Procopio, Cory, Hargreaves & Savitch LLP

(57) ABSTRACT

A data store volume (DSVOL) for a snapshot group which is a group of the PVOL and one or more SVOLs for the PVOL is a data storage region where data of which a storage destination is one volume (VOL) of the snapshot group and meta-information of the data are stored, and the meta-information is information including address mapping between a reference source address which is an address of a position of the data in the snapshot group and a reference destination address which is an address of a position of the data in the DSVOL. A process of a storage system increases the number of DSVOLs in the snapshot group when an input/output (I/O) load on the snapshot group exceeds a threshold.

13 Claims, 13 Drawing Sheets

(56) References Cited

U.S. PATENT DOCUMENTS

2023/0237065 A1\* 7/2023 Kulkarni ............... G06F 3/0619
  707/634
2023/0350758 A1\* 11/2023 Bhargava M.R. .. G06F 11/1448

\* cited by examiner

FIG. 4

VOL MANAGEMENT TABLE 205

| VOL ID (41) | VOL ATTRIBUTE (42) | VOL CAPACITY (43) | PHYSICAL ADDRESS RANGE (44) | SnapShot Group ID (45) | Root VOL ID (46) | GENERA-TION # (47) | POOL ID (48) | DSVOL ID (49) |
|---|---|---|---|---|---|---|---|---|
| 0 | THIN PROVISIONING | 200GB | - | - | 0 | 0x0000 | 0 | 7 |
| 1 | PVOL | 100GB | - | 0 | 1 | 0x0003 | 0 | 8 |
| 2 | SVOL | 100GB | - | 0 | 1 | 0x0001 | 0 | 8 |
| 3 | SVOL | 100GB | - | 0 | 1 | 0x0002 | 0 | 8 |
| 4 | PVOL | 100GB | - | 1 | 4 | 0x0003 | 1 | 9, 10, ..., k |
| 5 | SVOL | 100GB | - | 1 | 4 | 0x0001 | 1 | 9, 10, ..., k |
| 6 | SVOL | 100GB | - | 1 | 4 | 0x0002 | 1 | 9, 10, ..., k |
| 7 | DSVOL | 20GB | 0x00000000~0x0C7FFFFF | - | 0 | - | 1 | - |
| 8 | DSVOL | 20GB | 0x10000000~0x117FFFFF | - | 1 | - | 1 | - |
| 9 | DSVOL | 20GB | 0x20000000~0x217FFFFF | - | 4 | - | 1 | - |
| 10 | DSVOL | 20GB | 0x30000000~0x317FFFFF | - | 4 | - | 1 | - |
| ... | ... | ... | ... | ... | ... | ... | ... | ... |
| k | DSVOL | 20GB | 0xF0000000~0xF17FFFFF | - | 4 | - | 1 | - |
| ... | ... | ... | ... | ... | ... | ... | ... | ... |

FIG. 5

PERFORMANCE MANAGEMENT TABLE 206

| SnapShot Group ID (51) | VOL INFLOW AMOUNT (52) | TOTAL INFLOW AMOUNT (53) | EXPECTED INFLOW AMOUNT (54) | NUMBER OF DSVOLS (55) |
|---|---|---|---|---|
| 0 | VOL ID 1  110MB/s<br>VOL ID 2  50MB/s<br>VOL ID 3  50MB/s | 210MB/s | 150MB | 1 |
| 1 | VOL ID 4  110MB/s<br>VOL ID 5  50MB/s<br>VOL ID 6  50MB/s | 210MB/s | 600MB/s | 4 |
| ... | ... | ... | ... | ... |

FIG. 6

MAPPING MANAGEMENT TABLE 207

| REFERENCE SOURCE VOL ID (61) | REFERENCE SOURCE ADDRESS (62) | REFERENCE DESTINATION VOL ID (63) | REFERENCE DESTINATION ADDRESS (64) | GENERATION # (65) |
|---|---|---|---|---|
| 1 | 0x10001000 | 8 | 0x80001000 | 0x0001 |
| 1 | 0x10002000 | 8 | 0x80003000 | 0x0002 |
| ... | ... | ... | ... | ... |
| 2 | 0x30001000 | 8 | 0x80001000 | 0x0001 |
| 2 | 0x30002000 | 8 | 0x80002000 | 0x0001 |
| ... | ... | ... | ... | ... |

FIG. 7

LOGICAL-PHYSICAL CONVERSION TABLE 208

| VOL ID | LOGICAL ADDRESS | POOL ID | PHYSICAL ADDRESS |
|---|---|---|---|
| 8 | 0x80001000 | 0 | 0x10001000 |
| 8 | 0x80002000 | 0 | 0x10002000 |
| 8 | 0x80003000 | 0 | 0x10003000 |
| ... | ... | ... | ... |

FIG. 8

VACANT SEARCH TABLE 209

| VOL ID | VACANT CAPACITY | VACANT SEARCH POINTER |
|---|---|---|
| 7 | 10GB | 0x70010000 |
| 8 | 10GB | 0x80000000 |
| 9 | 10GB | 0x90100000 |
| ... | ... | ... |

FIG. 9

ALLOCATION MANAGEMENT TABLE 210

| VOL ID (91) | LOGICAL ADDRESS (92) | ALLOCATION OR NON-ALLOCATION (93) |
|---|---|---|
| 8 | 0x80001000 | ALLOCATED |
| 8 | 0x80002000 | ALLOCATED |
| 8 | 0x80003000 | ALLOCATED |
| 8 | 0x80004000 | UNALLOCATED |
| ... | ... | ... |

FIG. 10

POOL ALLOCATION MANAGEMENT TABLE 211

| POOL ID (101) | POOL CAPACITY (102) | POOL VACANT CAPACITY (103) | RAID GROUP ID (104) |
|---|---|---|---|
| 0 | 1TB | 500GB | 0 |
| 1 | 2TB | 1TB | 1 |
| ... | ... | ... | ... |

FIG. 11

DRIVE ALLOCATION MANAGEMENT TABLE 212

| RAID GROUP ID (111) | RAID LEVEL (112) | DRIVE ID (113) | DRIVE TYPE (114) | CAPACITY (115) | USAGE CAPACITY (116) |
|---|---|---|---|---|---|
| 0 | RAID5 | 0, 1, 2, 3 | SSD | 1TB | 500GB |
| 1 | RAID5 | 4, 5, 6, 7 | SSD | 2TB | 1TB |
| ... | ... | ... | ... | ... | ... |

STORAGE SYSTEM AND STORAGE CONTROL METHOD

BACKGROUND OF THE INVENTION

1. Field of the Invention

The present invention generally relates to storage control of a storage system.

2. Description of Related Art

As one of the functions of a storage system, a snapshot function is known. For example, there is a request for a snapshot function capable of restoring backup from occurrence of a failure quickly at a high frequency.

For the snapshot function, for example, a technology disclosed in U.S. Pat. No. 10,963,485B is known. U.S. Pat. No. 10,963,485B discloses a technology related to a snapshot function of a redirect-on-write (RoW) scheme and specifically discloses a technology for compatibility between I/O performance and operability of a snapshot. The ROW scheme is a scheme of following and writing data. The following and writing is a data storage scheme of storing writing target data in a new region without overwriting data stored before writing and rewiring meta-information so that data stored in the new region is referred to when the data is written on a storage system.

Hereinafter, a duplicated volume produced in accordance with the ROW scheme with regard to a primary volume (PVOL) is referred to as a secondary volume (SVOL) for convenience. The SVOL is a snapshot of the PVOL.

According to the technology disclosed in U.S. Pat. No. 10,963,485B, there is a data store volume (DSVOL) which is a data storage region where metadata of data or the data itself are stored, and the PVOL and the SVOL shares the same DSVOL. Therefore, when input/output (I/O) is executed on the PVOL and I/O is also executed on the SVOL, I/O is executed on the same DSVOL. As a result, I/O is focused on the DSVOL, and thus there is concern of performance of the PVOL and the SVOL deteriorating. When the SVOL (snapshot) increases with respect to the PVOL, the performance of the PVOL and the SVOL is highly likely to deteriorate.

SUMMARY OF THE INVENTION

A storage system determines whether an input/output (I/O) load on a snapshot group which is a group of a PVOL and one or more SVOL for the PVOL exceeds a threshold. When a determination result is positive, the storage system increases the number of DSVOLS.

According to the present invention, even when the number of SVOLs (snapshots) for the same PVOL increases, avoidance of deterioration in the performance of the PVOL and the SVOLs can be expected. The problem, the configuration, and the advantages described above are apparent from the description of the following embodiments.

BRIEF DESCRIPTION OF THE DRAWINGS

FIG. 4 is a diagram illustrating a configuration of a VOL management table;

FIG. 5 is a diagram illustrating a configuration of a performance management table;

FIG. 6 is a diagram illustrating a configuration of a mapping management table;

FIG. 7 is a diagram illustrating a configuration of a logical-physical conversion table;

FIG. 8 is a diagram illustrating a configuration of a vacant search table;

FIG. 9 is a diagram illustrating a configuration of an allocation management table;

FIG. 10 is a diagram illustrating a configuration of a pool allocation management table;

FIG. 11 is a diagram illustrating a configuration of a drive allocation management table;

DESCRIPTION OF EMBODIMENTS

Figure 1:
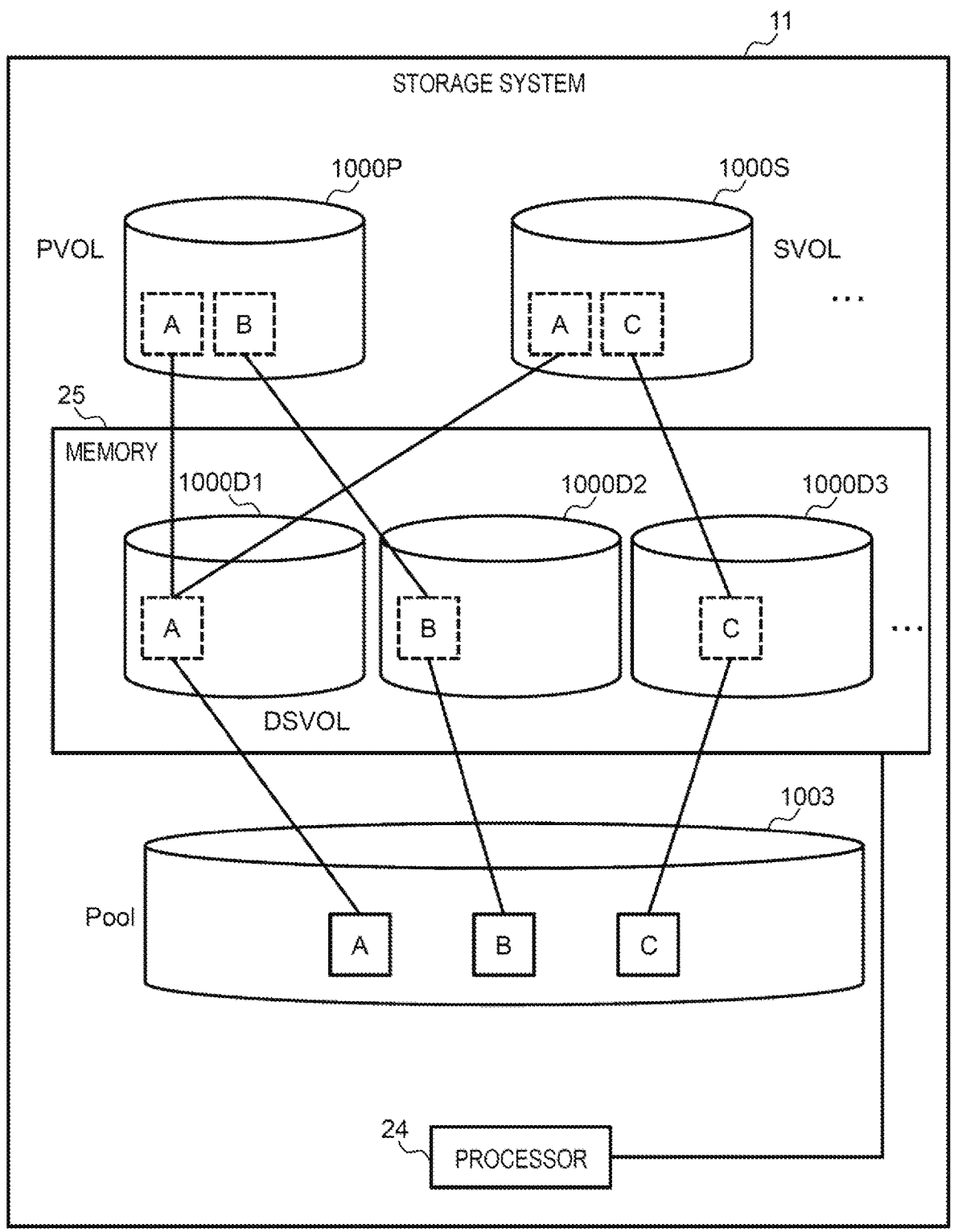
FIG. 1 is a diagram illustrating an overview of a storage system according to an embodiment.

In the following description, an "interface device" may be one or more interface devices. The one or more interface devices may be at least one of the following interface devices.

One or more input/output (I/O) interface devices. An input/output (I/O) interface device is an interface device for at least one of a remote display computer and an I/O device. The I/O interface device for the display computer may be a communication interface device. At least one I/O device may be one of user interface devices, for example, an input device such as a keyboard and a pointing device and an output device such as a display device.

One or more communication interface devices. One or more communication interfaces may be the same type of one or more communication interfaces of the related art (for example, one or more network interface cards) or may be different types of two or more communication interfaces (for example, an NIC and a host bus adapter (HBA)).

In the following description, a "memory" is one or more memory devices which are examples of one or more storage devices and may be typically main storage devices. At least one memory device in a memory may be a volatile memory device or a nonvolatile memory device.

In the following description, a "permanent storage device" may be one or more permanent storage devices which are examples of one or more storage devices. A permanent storage device may be typically a nonvolatile storage device (for example, an auxiliary storage device). Specifically, for example, a hard disk drive (HDD), a solid-state drive (SSD), a non-volatile memory express (NVME) drive, or a storage class memory (SCM) may be used.

In the following description, a "storage device" may be at least a memory and a memory of a permanent storage device.

In the following description, a "processor" may be one or more processor devices. At least one processor device may be typically a microprocessor device such as a central processing unit (CPU) or may another type processor device such as a graphics processing unit (GPU). At least one processor device may be single core or multi-cores. At least one processor device may be a processor core. At least one processor device may be a circuit which is a collection of gate arrays by a hardware description language executing some or all of processes (for example, a field-programmable gate array (FPGA) or a complex programmable logic device (CPLD), or an extensive processor device such as an application specific integrated circuit (ASIC)).

In the following description, in an expression such as "xxx table," information in which an output can be obtained with respect to an input is described in some cases, but the information may be data with any structure (for example, may be structured data or may be unstructured data) or may be a learning model typified by a neural network, a genetic algorithm, or a random forest generating an output with respect to an input. Accordingly, "xxx table" can be said to be "xxx information." In the following description, a configuration of each table is exemplary. One table may be divided into two or more tables, or some or all of two or more tables may be integrated as one table.

In the following description, a process in which a "program" is a subject will be described in some cases. However, the program is executed by a processor, so that a predetermined process is executed appropriately using a storage device and/or an interface device. Therefore, a subject of the process may be considered to be a processor (alternatively, an apparatus or a system including the processor). The program may be installed in an apparatus such as a computer from a program source. The program source may be, for example, a recording medium (for example, a non-transitory recording medium) which can be read by a program distribution server or computer. In the following description, one or more programs may be implemented as one program, or one program may be implemented as two or more programs.

In the following description, "VOL" is an abbreviation for a logical volume and may be a logical storage region. A VOL may be a realistic VOL (RVOL) or a virtual VOL (VVOL). An "RVOL" may be a VOL which is based on physical storage resources (for example, one or more RAID groups) providing the RVOL. A "VVOL" may be any of an external connection VOL (EVOL), a capacity expansion VOL (TPVOL), and a snapshot VOL (SSVOL). An EVOL may be a VOL that is based on a storage space (for example, a VOL) of an external storage system and confirms with a storage virtualization technology. A TPVOL may be a VOL that includes a plurality of virtual regions (virtual storage regions) and confirms with a capacity virtualization technology (typically, a thin provisioning). An SSVOL may be a VOL that is provided as a snapshot of an original VOL. An SSVOL may be an RVOL. Typically, an SSVOL is placed as a secondary VOL when an original VOL serves as a primary VOL (PVOL). A "pool" is a logical storage region (for example, a set of a plurality of pool VOLs) and may be prepared according to usage. For example, as a pool, at least one type of pool between a TP pool and a snapshot pool may be provided. A TP pool may be a storage region configured as a plurality of actual regions (realistic storage regions). When an actual region cannot be allocated to a virtual region (a virtual region of TPVOL) to which an address designated by a write request received from a host system belongs, a storage system allocates an actual region to the virtual region (a write destination virtual region) from the TP pool (even when another actual region is allocated to a write destination virtual region, an actual region may be newly allocated to the write destination virtual region). The storage system may write write target data corresponding the write request in an allocated actual region. The snapshot pool may be a storage region where data is saved from the PVOL. One pool may be used as a TP pool or a snapshot pool. A "pool VOL" may be a VOL which is a constituent of a pool. A pool VOL may be an RVOL or may be an EVOL.

A "storage system" may be a system that includes a controller executing I/O of data on a plurality of permanent storage devices (or a device including a plurality of permanent storage devices) or may be a system that includes one or more physical computers. In the latter system, for example, one or more physical computers may each execute predetermined software, so that the one or more physical computers may be configured as software-defined anything (SDx). As the SDx, for example, a software-defined storage (SDS) or a software-defined data center (SDDC) can be adopted.

In the following description, an ID is adopted as an example of identification information of an element. The identification information may be information capable of identifying an element such as a name.

In the following description, when the same type of elements are not distinguished in description, a common number is used among reference numerals. When the same type of elements are distinguished in description, reference numerals are used in some cases. For example, when a plurality of storage controllers are not distinguished from each other, the storage controllers are referred to as "storage controllers 22." When the storage controllers are distinguished from each other, the storage controllers are referred to as a "storage controller 22-1" and a "storage controller 22-2."

Hereinafter, embodiments of the present invention will be described with reference to the drawings.

First Embodiment

FIG. 1 illustrates an overview of a storage system according to a first embodiment.

A storage system 11 includes a processor 24 that produces an SVOL 1000S which is a snapshot of a PVOL 1000P. The processor 24 produces the SVOL 1000S of the PVOL 1000P in accordance with the ROW scheme.

A DSVOL 1000D for a snapshot group which is a group of the PVOL 1000P and one or more SVOLs 1000S for the PVOL 1000P is a data storage region where data of which a storage destination is one VOL of the snapshot group and meta-information of the data are stored. The meta-information is information including address mapping between a reference source address which is an address of a position of the data in the snapshot group and a reference destination address which is an address of a position of data in the DSVOL.

The processor 24 executes I/O for updating meta-information of data in a write process which is a process of a write request for updating data in one VOL of the snapshot group with respect to the DSVOL 1000D storing the meta-information.

The processor 24 determines whether an input/output (I/O) load on the snapshot group exceeds a threshold. When a determination result is positive (when the load exceeds the threshold), the processor 24 increases the number of DSVOLs 1000D for the snapshot group. Accordingly, the I/O load on the snapshot group is expected to be distributed to the plurality of DSVOLS 1000D including the increased number of DSVOLS 1000D. Therefore, even when the number of SVOLs 1000S is increased with respect to the PVOL 1000D, avoidance of deterioration in performance of each VOL 1000 in the snapshot group can be expected. In the embodiment, the increase in the number of DSVOLS 1000D for the snapshot group is referred to as: "DSVOL expansion" in the embodiment. An example of the DSVOL expansion is as follows.

It is assumed that data A is stored in the PVOL 1000P. The DSVOL 1000D for the snapshot group including the PVOL 1000P is only a DSVOL 1000D1. Therefore, the data A is stored in the DSVOL 1000D1 and is stored in the pool 1003. In the meta-information of the data A, a reference source address is an address of a position (a position of the data A) in the PVOL 1000P and a reference destination address is an address of a position (the position of the data A) in the DSVOL 1000D1. The storage system 11 manages mapping between the reference destination address (the address of the position (the position of the data A) in the DSVOL 1000D1) and the address (the position of the data A) of the position in the pool 1003.

It is assumed that the SVOL 1000S is produced as a snapshot of the PVOL 1000P. It is assumed that an I/O load on the PVOL 1000P and the SVOL 1000S increases and the I/O load consequently exceeds a threshold. Therefore, it is assumed that the processor 24 increases two DSVOLs 1000D for the snapshot group and the DSVOLs 1000D for the snapshot group are DSVOLs 1000D1 to 1000D3.

The processor 24 equalizes amounts of data stored in the plurality of DSVOLs 1000D for the snapshot group. Accordingly, since a plurality of pieces of data and meta-information of which a storage destination is the snapshot group are distributed to the plurality of DSVOLs 1000D, the I/O load on the snapshot group is distributed to the plurality of DSVOLS 1000D, and thus avoidance of deterioration in the performance of each VOL 1000 in the snapshot group can be expected.

The equalization may be implemented as follows, for example. That is, in a process of a write request for one VOL 1000 in the snapshot group, the processor 24 selects the DSVOL 1000D of the storage destination of write data target which is data incidental to the write request and stores the write target data in the selected DSVOL 1000D so that the amounts of data stored in the plurality of DSVOLS 1000D are equalized. Accordingly, in every process of the write request for the VOL 1000P or 1000S, distribution of the data to the plurality of DSVOLs 1000D is expected. For example, when the processor 24 processes a write request of new data B which is a write request for designating the PVOL 1000P, the processor 24 selects a DSVOL 1000D2 as a storage destination of new write target data B and stores the new write target data B in the DSVOL 1000D2. Thereafter, for example, when the processor 24 processes a write request of new data C which is a write request for designating the SVOL 1000S, the processor 24 selects a DSVOL 1000D3 as a storage destination of new write target data C and stores the new write target data C in the DSVOL 1000D3. As a result, the pieces of data A, B, and C are distributed to the plurality of DSVOLs 1000D1 to 1000D3. In each of the PVOL 1000P and the SVOL 1000S, the "new data" may be data which is not yet a write target in the VOL 1000 and "data after update" may be data after update of the written data already considered as a write target in the VOL 1000.

The equalization may be implemented as follows, for example, instead of or in addition to the above-described method. That is, the equalization includes movement of data between the DSVOLs 1000D and the processor 24 executes the equalization including the movement of the data between the DSVOLs 1000D in asynchronization with an I/O request (a write request or a read request) for one VOL in the snapshot group. Accordingly, the implementation of the equalization without deterioration can be expected to equalize processing performance of the I/O request.

Hereinafter, the embodiment will be described in detail.

Figure 2:
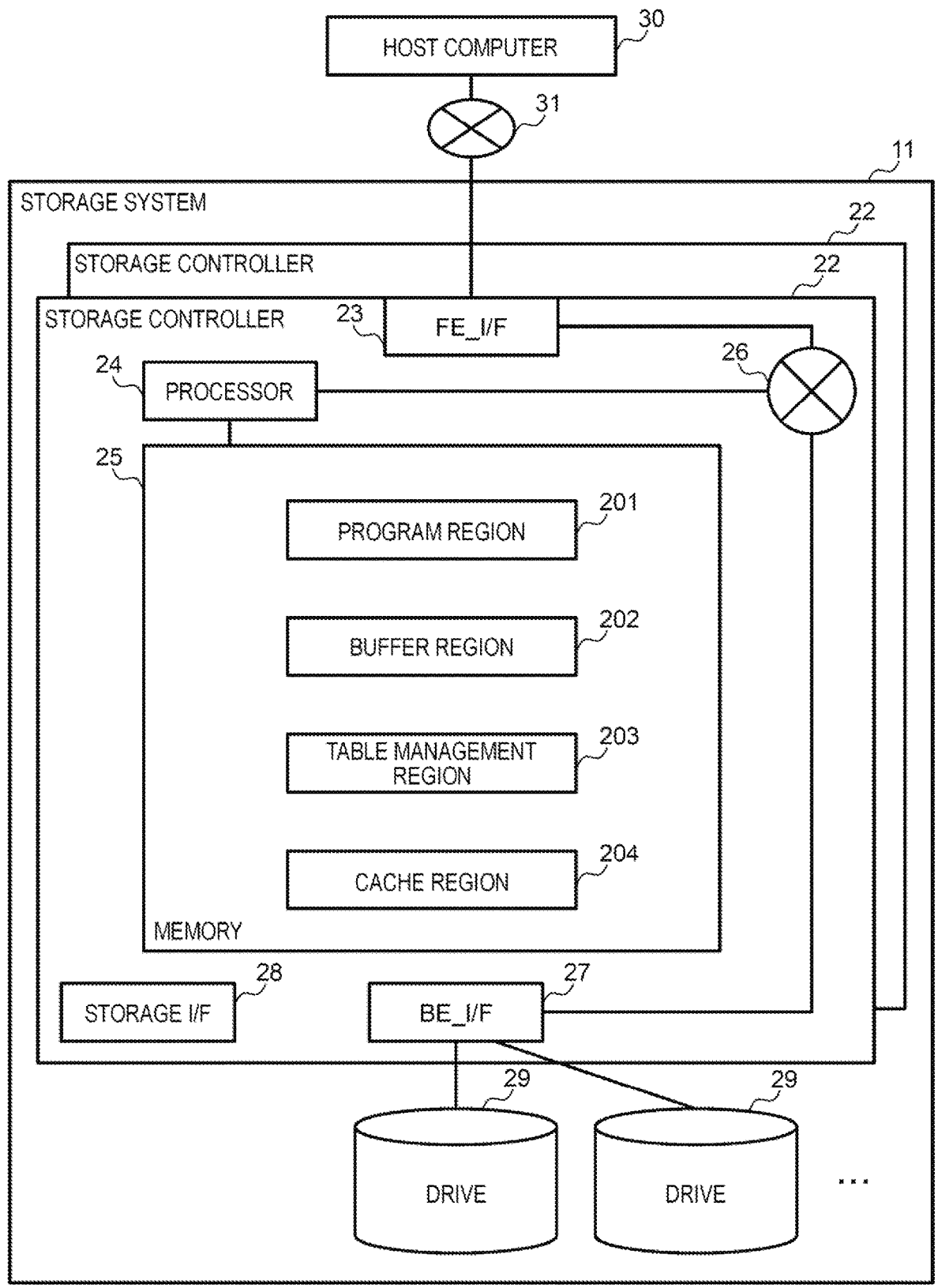
FIG. 2 is a diagram illustrating an exemplary configuration of the storage system.

FIG. 2 illustrates a configuration of the storage system 11.

The storage system 11 includes one or more storage controllers 22 and various drives 29 connected to the one more storage controller 22.

The storage controllers 22 include a frontend interface device (FE_I/F) 23 that communicates with a host computer 30 via a network 31 (for example, the Internet or a wide area network (WAN)), a storage I/F (storage interface device) 28 for communication between storage systems, the processor 24 that controls the entire storage system 11, a memory 25 that stores information and a program used by the processor 24, a BE_I/F (backend interface device) 27 that communicates with a drive 29, and an internal network 26 that connects them. The FE_I/F 23, the BE_I/F 27, and the storage I/F 28 are examples of an interface device. The drive 29 is a device that includes a nonvolatile data storage medium and is an example of a permanent storage device.

The memory 25 has a program region 201 where a program is managed, a buffer region 202 which is a temporary storage region at the time of transfer and copying of data, a table management region 203 where various tables are stored, and a cache region 204 where write target data (data written in response to a write request) from the host computer 30 and read target data (data read in response to a read request) from the drive 29 are temporarily stored.

The storage controller 22 receives an I/O request for designating the VOL 1000 from the host computer 30 and executes I/O of data in response to the I/O request. The host computer 30 is an example of a transmission source of an I/O request. The transmission source of an I/O request may be an element other than the host computer 30 or may be, for example, an application program executed inside or outside of the storage system 11.

In the embodiment, the DSVOL 1000D is a VOL based on the memory 25 (for example, the cache region 204) and may be another type of VOL such as an external connection VOL (EVOL) instead of the VOL.

Figure 3:
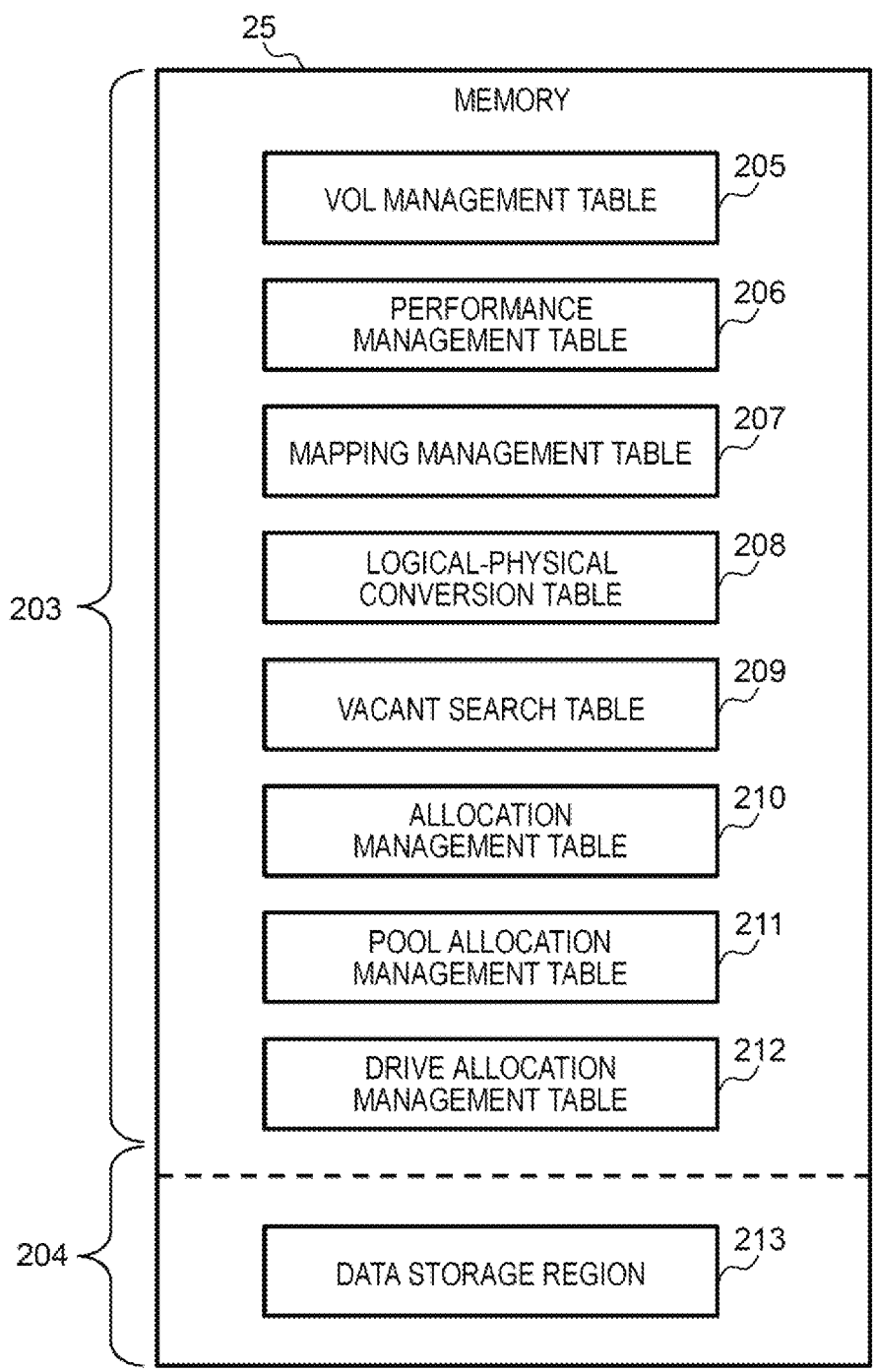
FIG. 3 is a diagram illustrating an exemplary configuration of a memory region.

FIG. 3 illustrates a configuration of a memory region.

The cache region 204 on the memory 25 has a data storage region 213 where write target data or read target data is temporarily stored.

The table management region 203 has a VOL management table 205 in which information regarding the VOL 1000 is stored, a performance management table 206 in which information regarding I/O performance of a snapshot group is stored, a mapping management table 207 in which information indicating a correspondent relationship between logical addresses in the snapshot group and logical addresses in the DSVOL 1000D is stored, a logical-physical conversion table 208 in which physical addresses for logical addresses are managed, a vacant search table 209 in which information regarding vacancy of the DSVOL 1000D is stored, an allocation management table 210 in which information regarding allocation of logical addresses of the DSVOLS 1000D is stored, a pool allocation management table 211 in which information regarding a pool is retained, and a drive allocation management table 212 in which information regarding drive allocation is stored.

FIG. 4 illustrates a configuration of the VOL management table 205. To avoid redundancy of description, a VOL 1000 in which a VOL ID is "n" is referred to as a "VOLn" in the following description. A snapshot group in which a snapshot group ID is "m" is referred to as a "snapshot group m."

The VOL management table 205 has an entry for each VOL 1000. The entry has information such as a VOL ID 41, a VOL attribute 42, a VOL capacity 43, a physical address range 44, a snapshot group ID 45, a root VOL ID 46, a generation #47, a pool ID 48, and a DSVOL ID 49.

The VOL ID 41 indicates an ID of the VOL 1000. The VOL attribute 42 indicates an attribute of the VOL 1000. The VOL capacity 43 indicates a capacity of the VOL 1000. The physical address range 44 is valid information for the DSVOL 1000D and indicates a region allocated to the DSVOL 1000D in a range of a physical address corresponding to the DSVOL 1000D (an address range of a region allocated to the DSVOL 1000D in the pool 1003). The snapshot group ID 45 is valid information for the PVOL 1000P or the SVOL 1000S and is an ID of the snapshot group to which the PVOL 1000P or the SVOL 1000S belongs.

The root VOL ID 46 is an ID of a root VOL of the VOL 1000. The "root VOL" is a VOL of a root in a VOL set. Specifically, for each of the PVOL 1000P and the SVOL 1000S, the root VOL is the PVOL 1000P in the snapshot group including the VOL 1000. For the DSVOL 1000D, the root VOL is the PVOL 1000P in the snapshot group of an allocation destination (connection destination) of the DSVOL 1000D.

The generation #47 indicates a generation number of the VOL 1000 (excluding the DSVOL 1000D). The older the generation number is, the older the generation of the VOL 1000 is. For example, in snapshot group 0, the generation of an SVOL 1 is the oldest and the generation of an SVOL 2 is the second oldest. When the SVOL 1000S is produced for the PVOL 1, the generation #47 of the further produced SVOL 1000S is "0×0003" and the generation #47 of the PVOL 1 is increased to "0×0004."

The pool ID 48 is an ID of the pool 1003 allocated to the VOL 1000. In the example illustrated in FIG. 4, there are two or more pools 1003 in the storage system 11. The number of pools 1003 may be one.

The DSVOL ID 49 is an ID of one DSVOL 1000D or each of the plurality of DSVOLs 1000D allocated to the VOL 1000. As illustrated in FIG. 4, for the PVOL 1000P and the SVOL 1000S, the DSVOL 1000D is allocated to the snapshot group. In the example illustrated in FIG. 4, the DSVOL 1000D allocated to snapshot group 1 is only a DSVOL 8, but the plurality of DSVOLS 1000D (DSVOLs 9, 10, . . . , k) are allocated to snapshot group 2.

FIG. 5 illustrates a configuration of the performance management table 206.

The performance management table 206 has an entry for each snapshot group. The entry has information such as a snapshot group ID 51, a VOL inflow amount 52, a total inflow amount 53, an expected inflow amount 54, and the number of DSVOLS 55.

The snapshot group ID 51 is an ID of the snapshot group. The VOL inflow amount 52 indicates an inflow amount of each VOL 1000 in the snapshot group. The "inflow amount" is an example of an I/O load and is an amount of data written per unit time. Instead of or in addition to the inflow amount, another type of I/O load, for example, at least a write frequency may be adopted as the I/O load among an outflow amount (an amount of data written per unit time), a write frequency (the number of write requests per unit time), a read frequency (the number of read requests per unit time).

The total inflow amount 53 indicates a total of inflow amounts of all the VOLs 1000 in the snapshot group.

The expected inflow amount 54 is an example of an I/O load threshold and is a threshold of the total inflow amount 53. The number of DSVOLS 55 indicates the number of DSVOLS 1000D allocated to the snapshot group. The expected inflow amount 54 is determined based on the number of DSVOLS 55. For example, the expected inflow amount 54 is a value equal to or less than a product of performance (an inflow amount) of the DSVOL 1000D and the number of DSVOLS 55.

FIG. 6 illustrates a configuration of the mapping management table 207.

The mapping management table 207 has an entry for each address mapping. The address mapping is mapping between a logical address of a position in the snapshot group and a logical address of a position in the DSVOL 1000D. The entry has information such as a reference source VOL ID 61, a reference source address 62, a reference destination VOL ID 63, a reference destination address 64, and a generation #65. Meta-information of data stored in the DSVOL 1000D includes information indicating address mapping of the data (information that has entries in the mapping management table 207).

The reference source VOL ID 61 is an ID of the PVOL 1000P or the SVOL 1000S that has a position in the snapshot group. The reference source address 62 indicates a logical address of a position identified from the reference source VOL ID 61 in the PVOL 1000P or the SVOL 1000S. A set of the reference source VOL ID 61 and the reference source address 62 indicates a logical address of a position in the snapshot group.

The reference destination VOL ID 63 is an ID of the DSVOL 1000D. The reference destination address 64 indicates a logical address of a position identified from the reference destination VOL ID 63 in the DSVOL 1000D. A set of the reference destination VOL ID 63 and the reference destination address 64 indicates a logical address of a position in the DSVOL 1000D.

The generation #65 indicates a generation number of the PVOL 1000P or the SVOL 1000S identified from the reference source VOL ID 61. The generation #65 is the same information as the generation #47 corresponding to the PVOL 1000P or the SVOL 1000S.

FIG. 7 illustrates a configuration of the logical-physical conversion table 208.

The logical-physical conversion table 208 has an entry for each piece of data stored in the DSVOL 1000D. The entry has information such as a VOL ID 71, a logical address 72, a pool ID 73, and a physical address 74.

The VOL ID 71 is an ID of the DSVOL 1000D in which data is stored. The logical address 72 indicates a logical address of a position of the data in the DSVOL 1000D. The pool ID 73 is an ID of the pool 1003 in which the data is stored. The physical address 74 indicates a physical address of the position of the data in the pool 1003.

FIG. 8 illustrates a configuration of the vacant search table 209.

The vacant search table 209 has an entry for each DSVOL 1000D. The entry has information such as a VOL ID 81, a vacant capacity 82, and a vacant search pointer 83.

The VOL ID 81 is an ID of the DSVOL 1000D. The vacant capacity 82 indicates a vacant capacity in the DSVOL 1000D. The vacant search pointer 83 indicates a logical address of a head of a region corresponding to a vacant capacity.

In the embodiment, the vacant search pointer 83 initially indicates a head of a data region (for example, a region other than a meta-region which is a region where the meta-information is stored) of the DSVOL 1000D and is updated whenever a region is guaranteed and data is stored in the region. When data after update of the data is stored in the DSVOL 1000D, data before update is unnecessary data. Through garbage collection of the DSVOL 1000D, the unnecessary data may be deleted, a vacant region may occur, latest data (new data or data after update) may be transferred to the vacant region, meta-information of the data (the entries in the mapping management table 207) may be updated. That is, as a result, a vacant capacity in the DSVOL 1000D may be increased and a region having the vacant capacity may be continuous vacant regions.

FIG. 9 illustrates a configuration of the allocation management table 210.

The allocation management table 210 has an entry for each region in the DSVOL 1000D. The entry has information such as a VOL ID 91, a logical address 92, and allocation or non-allocation 93.

The VOL ID 91 is an ID of the DSVOL 1000D. The logical address 92 indicates a logical address of a region in the DSVOL 1000D. The allocation or non-allocation 93 indicates whether a region has been allocated. A region corresponding to "non-allocation" is a vacant region.

FIG. 10 illustrates a configuration of the pool allocation management table 211.

The pool allocation management table 211 has an entry for each pool 1003. The entry has information such as a pool ID 101, a pool capacity 102, a pool vacant capacity 103, and a RAID group ID 104.

The pool ID 101 is an ID of the pool 1003. The pool capacity 102 indicates a capacity of the pool 1003. The pool vacant capacity 103 indicates a vacant capacity in the capacity of the pool 1003. At least a partial capacity in the vacant capacity can be allocated as a capacity of the DSVOL 1000D. The RAID group ID 104 is an ID of each of one or more RAID groups which are a basis of the pool 1003.

FIG. 11 illustrates a configuration of the drive allocation management table 212.

The drive allocation management table 212 has an entry for each RAID group. The entry has information such as a RAID group ID 111, a RAID level 112, a drive ID 113, a drive type 114, a capacity 115, and a usage capacity 116.

The RAID group ID 111 is an ID of a RAID group. The RAID level 112 indicates a RAID level of the RAID group. The drive ID 113 is an ID of each of one or more drives included in the RAID group. The drive type 114 indicates a type of drive (for example, an HDD or an SSD) included in the RAID group. The capacity 115 indicates a capacity of the RAID group. The usage capacity 116 indicates a capacity used in the capacity of the RAID group.

Figure 12:
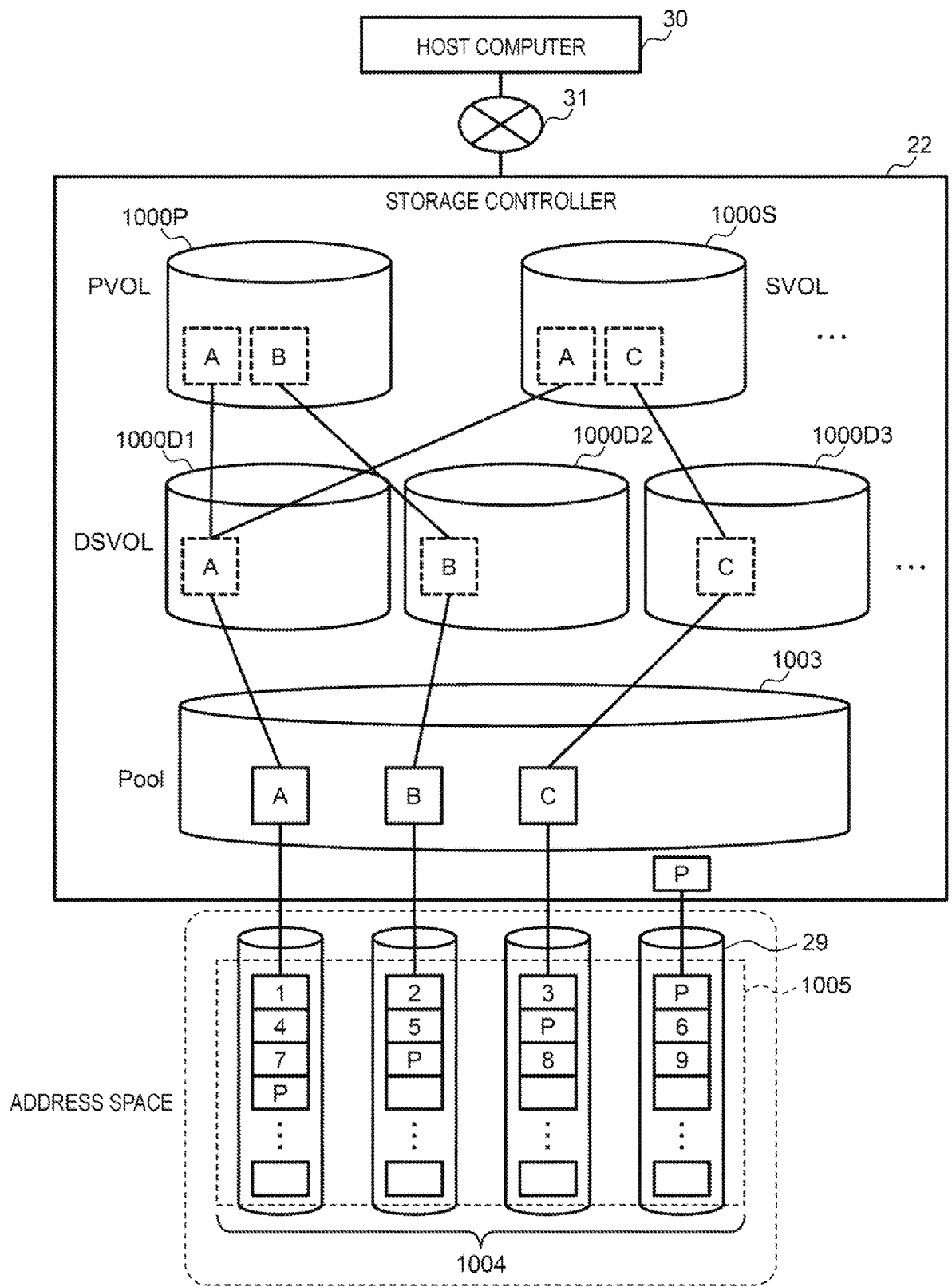
FIG. 12 is a diagram illustrating an example of a storage hierarchy.

FIG. 12 illustrates an example of a storage hierarchy.

The PVOL 1000P and the SVOL 1000S are supplied to the host computer 30. In a write request from the host computer 30, the PVOL 1000P or the SVOL 1000S can be designated. The write target data incidental to the write request is stored in the DSVOL 1000D and is stored in the pool 1003.

In the example of FIG. 8, the pool 1003 is a logical storage space to which an address space 1005 of the RAID group 1004 is allocated. The allocation from the pool 1003 to the address space 1005 is managed based on the drive allocation management table 212. A RAID level of the RAID group 1004 is a RAID 5 (3D+1P). The data A and the data B of which write destinations are the PVOL 1000P and data C of which a write destination is the SVOL 1000S are written on three different drives, and a parity P which is based on the pieces data A to C is written on a drive different from the three drives of the write destinations of the pieces of data A to C.

In the DSVOL 1000D, data after compression of the data may be stored instead of or in addition to the data (for example, the data A). The data stored in the plurality of DSVOLs 1000D may be deduplicated or addresses of a plurality of positions in the plurality of DSVOLs 1000D may be mapped to the addresses of the data stored in the pool 1003.

Hereinafter, an example of a process executed according to the embodiment will be described. In the process to be described below is executed by causing the processor 24 to execute a computer program stored in the program region 201. In the following description, an address of a position (region) in the PVOL 1000P or the SVOL 1000S is referred to as a "VOL address" and an address of a position (region) in the DSVOL 1000D is referred to as a "DSVOL address."

Figure 13:
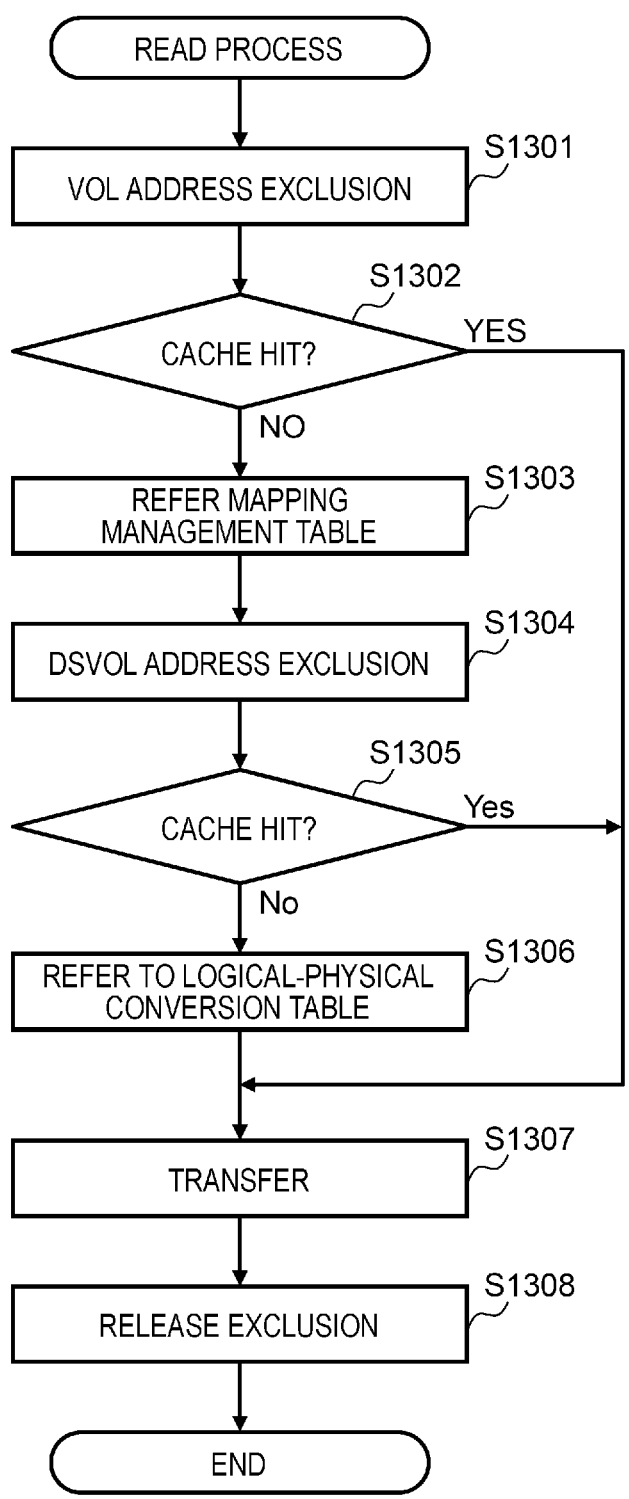
FIG. 13 is a flowchart illustrating a flow of a read process.

FIG. 13 is a flowchart illustrating a flow of a read process.

The read process starts when the storage system 11 receives a read request from the host computer 30 via the network 31. In the read request, for example, a VOL ID (an ID of the PVOL 1000P or the SVOL 1000S), a VOL address (a logical address), and a data size are designated.

The processor 24 guarantees an exclusion of a VOL address designated with the read request (S1301). When the exclusion of the VOL address has already been guaranteed for another I/O request, the processor 24 may execute S1301 after waiting for a given time. The guaranteeing of the exclusion may include guaranteeing of the exclusion of the meta-information indicating address mapping in which the designated VOL address is included as a reference source address.

The processor 24 determines whether there is read target data in the cache region 204 at the VOL address at which the exclusion is guaranteed (S1302). When a determination result of S1302 is positive (Yes in S1302), the process proceeds to S1307.

When the determination result of S1302 is negative (No in S1302), the processor 24 refers to the mapping management table 207 (S1303) and specifies the reference destination VOL ID 63 and the reference destination address 64 corresponding to the designated VOL address to guarantee exclusion of the reference destination VOL ID 63 and the reference destination address 64 (that is, the DSVOL address) (S1304). The guaranteeing of the exclusion may include guaranteeing of the exclusion of meta-information indicating address mapping in which the designated VOL address is included as a reference source address. The processor 24 determines whether there is read target data in the cache region 204 at a DSVOL address at which the exclusion is guaranteed (S1305). When a determination result of S1305 is positive (Yes in S1305), the process proceeds to S1307.

When the determination result of S1305 is negative (No in S1305), the processor 24 refers to the logical-physical conversion table 208 (S1306).

In the case of Yes in S1302 or Yes in S1305, or after S1306, the processor 24 reads the read target data and transfers the read target data to the host computer 30 (S1307). In S1307 after Yes in S1302 or Yes in S1305, the read target data is read from the cache region 204. In S1307 after S1306, the read target data is read from a region (a region in the pool 1003) of a physical address corresponding to the DSVOL address at which the exclusion is guaranteed.

After S1307, the processor 24 releases the exclusion of the VOL address (the exclusion guaranteed in S1301) (S1308). When S1308 is a process executed via S1304, the exclusion of the releasing target is the exclusion (the exclusion guaranteed in S1304) of the DSVOL address in addition of the exclusion of the VOL address.

Figure 14:
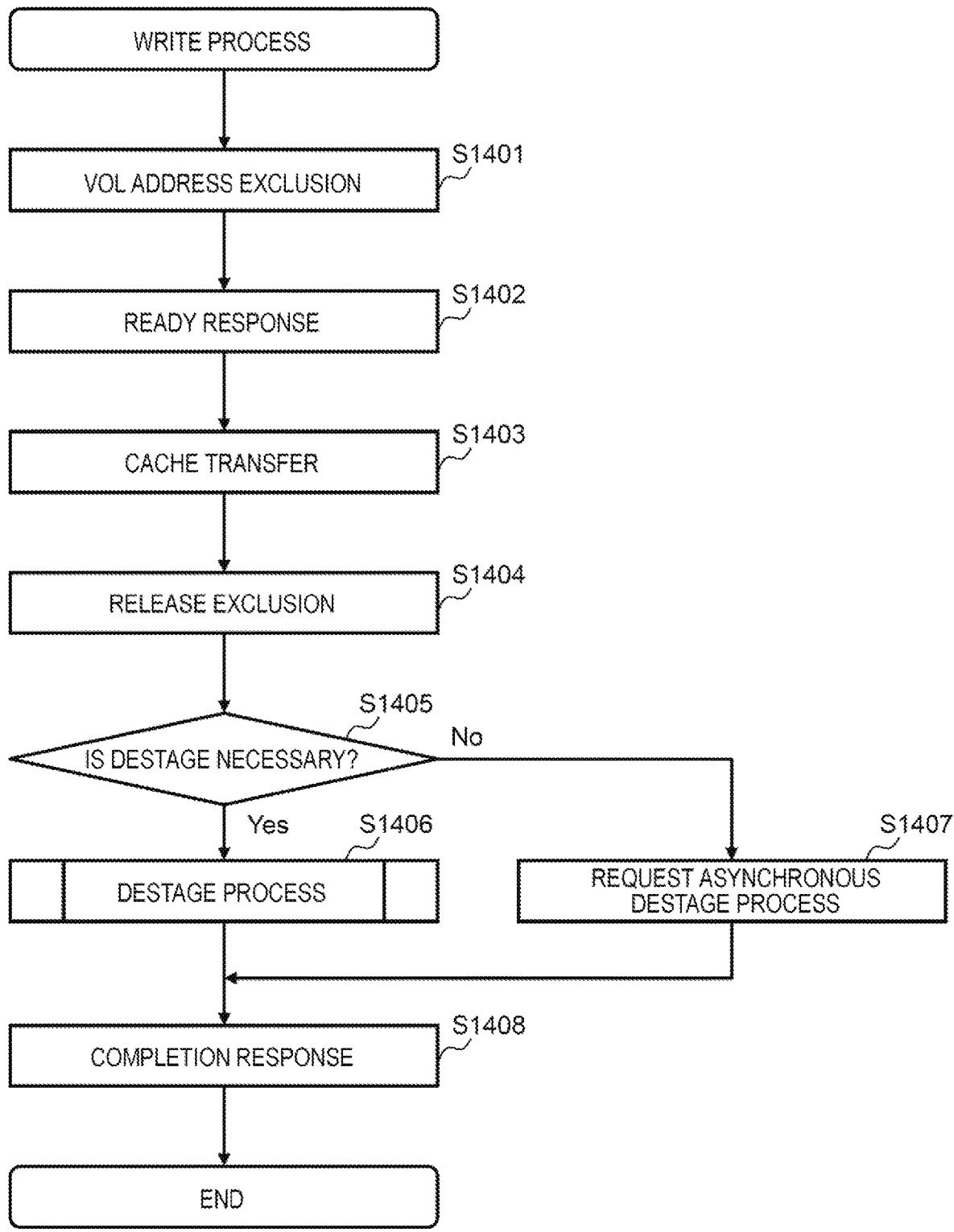
FIG. 14 is a flowchart illustrating a flow of a write process.

FIG. 14 is a flowchart illustrating a flow of a write process.

The write process starts when the storage system 11 receives a write request from the host computer 30. In the write request, for example, a VOL ID (an ID of the PVOL 1000P or the SVOL 1000S), a VOL address (a logical address), and a data size are designated.

The processor 24 guarantees exclusion of the VOL address designated with the write request (S1401). When exclusion of the VOL address has already been guaranteed for another I/O request, the processor 24 may execute S1401 after waiting for a given time. The guaranteeing of the exclusion may include guaranteeing of exclusion of meta-information indicating address mapping including the designated VOL address as a reference source address.

When the exclusion of the VOL address is guaranteed, the processor 24 responds to the host computer 30 with "Ready" indicating that preparation of the write process can be made (S1402). The processor 24 receives write target data from the host computer 30 receiving "Ready" and transfers (stores) the write target data in the cache region 204 (S1403). Thereafter, the processor 24 releases the exclusion of the VOL address (the exclusion guaranteed in S1401) (S1404).

The processor 24 determines whether destage is necessary (S1405). The "destage" mentioned here means transition of a data storage destination on the cache region 204 from the snapshot group (the PVOL 1000P and/or the SVOL 1000S) to the DSVOL 1000D. The "destage" may include storing of dirty data (data not stored in the drive 29) for the DSVOL 1000D from the cache region 204 to the drive 29. As a storage target in the drive 29 among the dirty data in the cache region 204, data which is not an I/O target for a given time may be preferred.

When a determination result of S1405 is positive (Yes in S1405), the processor 24 executes a destage process (S1406). When the determination result of S1405 is negative (No in S1405), the processor 24 issues an asynchronous destage processing request (a request for executing a destage process asynchronously with an I/O process (a write process and a read process)) (S1407).

After S1406 or S1407, the processor 24 responds to the host computer 30 with write completion (S1408).

A detailed example of S1405 will be described as follows. That is, in S1405, the fact that at least one determination result of the following (x) and (y) is positive may be the fact that a result obtained by determining whether the destage is necessary is positive:

(x) determination of whether a data amount of the dirty data on the cache region 204 is equal to or greater than a predetermined data amount; and (y) determination of whether a cache hit rate is less than a predetermined cache hit rate and a processor operation rate is equal to or greater than a predetermined processor operation rate.

When the fact that the determination result of (x) is positive is determination indicating that the destage is necessary, an amount of dirty data which can newly be stored in the cache region 204 increases, and thus an improvement in I/O performance can be expected. The "data amount of dirty data on the cache region 204" may be, for example, a data amount of dirty data of the snapshot group including the VOL 1000 designated with the write request in the dirty data on the cache region 204.

When the fact that the determination result of (y) is positive is determination indicating that the destage is necessary, an improvement in at least one of a cache hit rate and a processor operation rate is expected.

Figure 15:
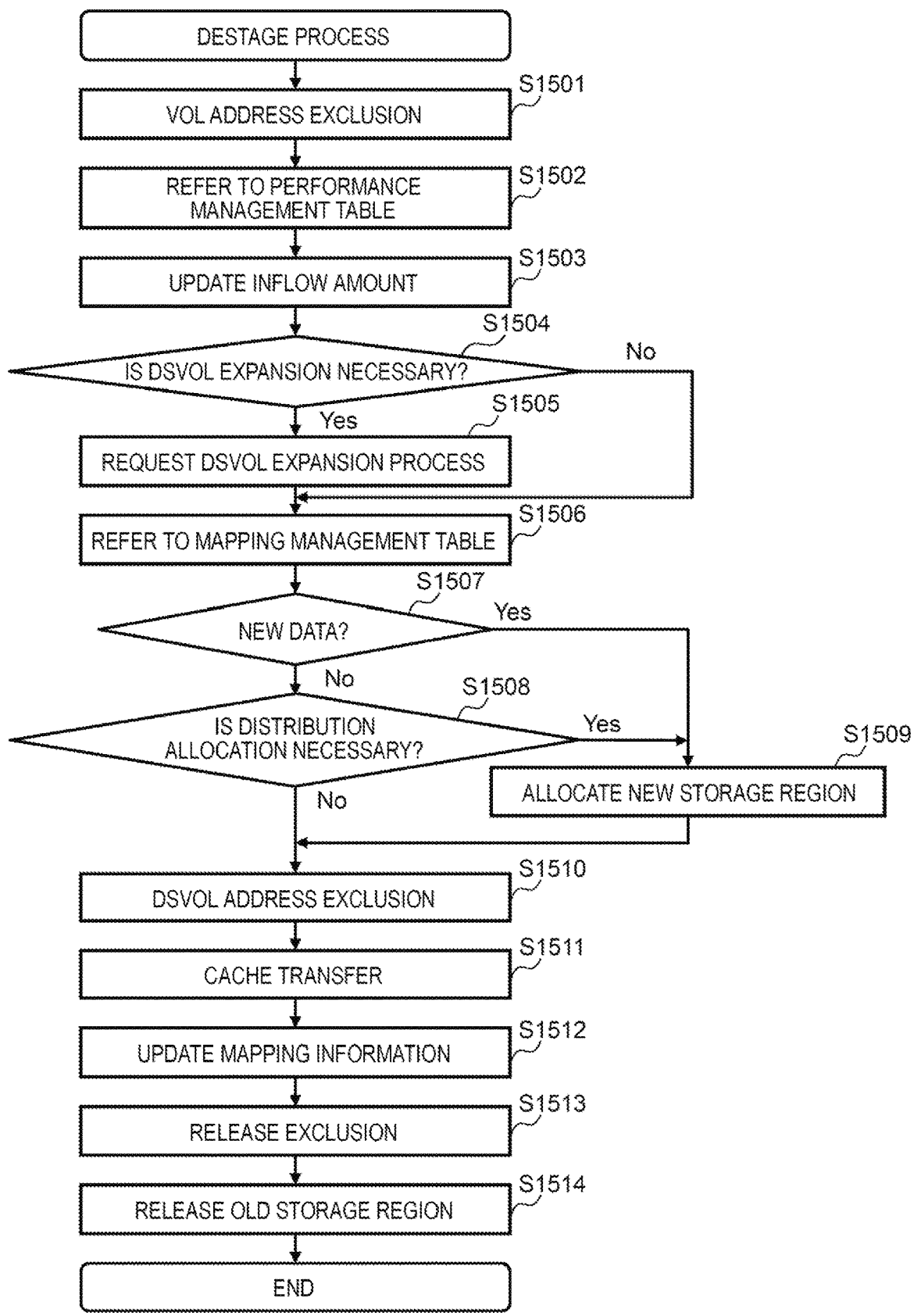
FIG. 15 is a flowchart illustrating a flow of a destage process.

FIG. 15 is a flowchart illustrating a flow of a destage process.

The destage process is executed in S1406 of the write process illustrated in FIG. 14 or is executed in response to the asynchronous destage processing request issued in S1407.

The processor 24 guarantees exclusion of the VOL address (S1501). The VOL addresses guaranteed herein are one or more VOL addresses corresponding to one or more pieces of data not stored in the DSVOL 1000D among the VOL addresses of the VOLs 1000 in one or more snapshot groups. Hereinafter, to facilitate description, one snapshot group is taken as an example.

The processor 24 refers to the performance management table 206 (S1502) and updates the VOL inflow amount 52 and the total inflow amount 53 of the snapshot group based on the VOL address at which the exclusion is guaranteed and data corresponding to the VOL address (S1503).

The processor 24 determines whether DSVOL expansion is necessary (S1504). When a determination result of S1504 is positive (Yes in S1504), the processor 24 issues a DSVOL expansion processing request (a request for executing a DSVOL expansion process) (S1505).

When the determination result of S1504 is negative (No in S1504) or after S1505, the processor 24 refers to the mapping management table 207 (S1506).

When the data corresponding to the VOL address at which the exclusion is guaranteed in S1501 is new data (Yes in S1507), the processor 24 executes new storage region allocation (S1509). In S1509, for example, the processor 24 selects the DSVOL 1000D corresponding to the snapshot group from the VOL management table 205, specifies a vacant region of the selected DSVOL 1000D from the vacant search table 209, allocates the specified vacant region to the VOL address, and updates the vacant capacity 82 and the vacant search pointer 83 of the DSVOL 1000D.

When the data corresponding to the VOL address at which the exclusion is guaranteed in S1501 is data after update (No in S1507), the processor 24 determines whether distribution allocation is necessary (S1508). When a determination result of S1508 is positive (Yes in S1508), the processor 24 executes S1509. In S1509, a vacant region serving as a storage destination of the data after update is specified from the DSVOL 1000D different from the DSVOL 1000D in which the data before update is stored.

When a determination result of S1508 is negative (No in S1508) or after S1509, the processor 24 guarantees exclusion of the DSVOL address (S1510). The DSVOL address at which the exclusion is guaranteed in S1510 is one of the following addresses:

a DSVOL address of the vacant region specified in S1509; and a DSVOL address of the vacant region specified based on the vacant search table 209 with respect to the DSVOL 1000D to which the DSVOL address of the data before update belongs.

The processor 24 executes cache transfer after S1510 (S1511). In S1511, the processor 24 transfers data of the VOL address (the data in the cache region 204) at which the exclusion is guaranteed in S1501 to a region of the DSVOL address at which the exclusion is guaranteed in S1510. That is, the destage from the VOL 1000 to the DSVOL 1000D in the snapshot group is executed. In S1511, the processor 24 stores the data transferred to the DSVOL 1000D in the drive 29 (the pool 1003). As a result, the data may be considered as clean data (data stored in the drive 29) from the dirty data.

The processor 24 executes mapping information update after S1511 (S1512). In S1512, the processor 24 updates the reference destination VOL ID 63 and the reference destination address 64 corresponding to the VOL address at which the exclusion is guaranteed in S1501 to information indicating the ID and the DSVOL address of the DSVOL 1000D having the DSVOL address at which the exclusion is guaranteed in S1510. In S1512, the processor 24 may update meta-information (meta-information in the DSVOL 1000D) indicating the address mapping including the VOL address at which the exclusion is guaranteed in S1501 as a reference source address so that the reference destination address of the reference source address becomes the DSVOL address at which the exclusion is guaranteed in S1510.

After S1511 and S1512, the processor 24 releases the exclusion of the VOL address (the exclusion guaranteed in S1501) and the exclusion of the DSVOL address (the exclusion guaranteed in S1510) (S1513). In the case through No in S1507, the processor 24 releases an old storage region (a storage region of the data before update) in the DSVOL 1000D (S1514). A capacity corresponding to the released old storage region may be considered to be immediately a vacant capacity or may be considered as a vacant capacity through garbage collection.

A detailed example of S1504 will be described as follows, for example. That is, I/O performance (for example, a data storage speed) of the DSVOL 1000D allocated to the snapshot group is divided into all the VOLs in the snapshot group. Therefore, when the total inflow amount 53 of the snapshot group is greater than the expected inflow amount 54 of the snapshot group, the processor 24 determines in S1504 that the DSVOL expansion is necessary.

In the snapshot group, the expected inflow amount 54 may be a sum of I/O performance of all the DSVOLs 1000D allocated to the snapshot group (for example, a product of I/O performance of the single DSVOL 1000D (for example, an expected inflow amount) and the number of DSVOLS 1000D) or may be a value less than the sum. Therefore, appropriate determination of necessity or non-necessity of the DSVOL expansion is expected. In the snapshot group, the expected inflow amount is prepared for each DSVOL allocated to the snapshot group. For each DSVOL, the determination of necessity or non-necessity of the DSVOL expansion may be first determination of whether an inflow amount of the DSVOL exceeds an expected inflow amount of the DSVOL. Instead of or in addition to the determination, for each of N or more DSVOLs among all the DSVOLs allocated to the snapshot group (where N is a natural number), the determination of necessity or non-necessity of the DSVOL expansion may be second determination of whether an inflow amount (an example of an I/O load) of the DSVOL exceeds an expected inflow amount (an example of expected I/O performance) of the DSVOL. When a result of one or both of the first and second determinations is positive, it may be determined that the DSVOL expansion is necessary. As a result of the determination, the DSVOL expansion is executed. Therefore, compatibility between an unnecessary increase in the number of DSVOLS, and avoidance of deterioration in the I/O performance of the PVOL 1000P and the SVOL 1000S is expected.

Since the I/O performance of the DSVOLs in the snapshot group is divided. Therefore, when I/O occurs considerably in a specific VOL (bias of I/O occurs), the I/O performance of the VOL deteriorates. Accordingly, by preventing the I/O from being biased to the specific VOL through QOS management of the I/O, homogenization of the I/O performance among the VOLS is expected.

The determination of necessity or non-necessity of the DSVOL expansion may include determination of whether a vacant capacity of the DSVOL 1000D allocated to the snapshot group is less than a predetermined rate of the capacity of the DSVOL 1000. When a result of the determination is positive, it may be determined that the DSVOL expansion is necessary.

A detailed example of S1508 will be described as follow, for example. That is, when data is biased to a specific DSVOL 1000D in the snapshot group to which the plurality of DSVOLs are allocated, update write (writing of data after update) is focused on the specific DSVOL 1000D, and thus performance neck can occur. Accordingly, in the embodiment, the processor 24 compares a data amount stored in each DSVOL 1000D allocated to the snapshot group (in other words, an allocation amount which is a total storage capacity of regions of logical addresses in an "allocated state" of the allocation or non-allocation 93 to the DSVOL 1000D) with a data amount stored in another DSVOL 1000D allocated to the snapshot group so that data is equally distributed to the plurality of allocated DSVOLS. The processor 24 stores write target data (new data or data after update) (and meta-information of the new data or the data after update) in the DSVOL 1000D in which a data amount is the smallest. In the equalization, for example, when Y is an amount of data stored in X DSVOLs 1000D (where X is an integer of 2 or more) allocated to the snapshot group, an amount of data stored in each DSVOL 1000D becomes Y/X. That is, in the equalization, for example, based on the number of DSVOLs 1000D allocated to the snapshot group and a total amount of valid data (the new data and the date after update) stored in all the DSVOLS 1000D allocated to the snapshot group, an amount of data stored in each DSVOL 1000D is determined.

To prevent the result of the determination of the necessity or non-necessity of the distribution allocation from being repeatedly switched, a given margin may be provided for the amount of data stored in each DSVOL 1000D. For example, the following equalization may be adopted. That is, when the number of DSVOLs 1000D allocated to the snapshot group is four, a bias-allowable condition is ±2%, and an address range of 73 GB is updated without new write (writing of new data), the following may be adopted:
  before distribution: 100 GB, 0 GB, 0 GB, and 0 GB; 100 GB in total; and
  after distribution: 27 GB, 25 GB, 24 GB, and 24 GB; 100 GB in total.

Data may be redisposed (equalized) through an asynchronous process with a process of an I/O request (for example, a process of a write request). For example, the processor 24 may periodically execute movement a data amount of data determined in an address order (ascending order) in the DSVOL 1000D between the DSVOLs 1000D or may execute movement of data between the DSVOLs 1000D for equalization in a period of time in which an operation rate of the storage system 11 is low.

Figure 16:
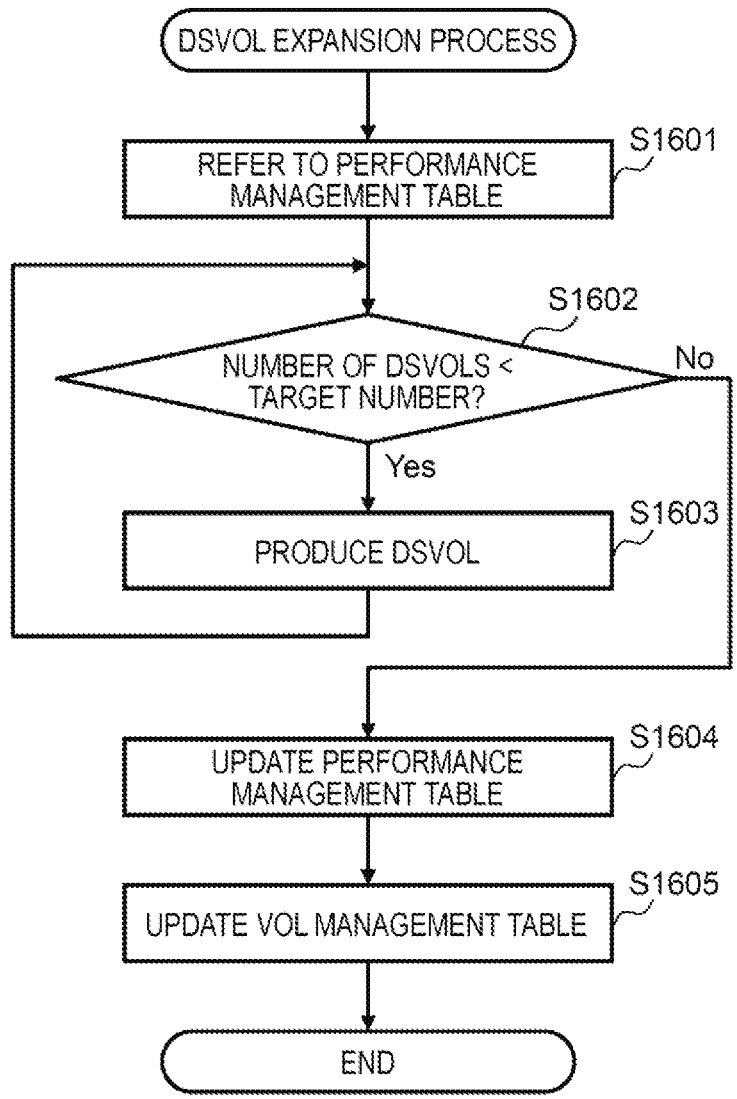
FIG. 16 is a flowchart illustrating a flow of a DSVOL expansion process.

FIG. 16 is a flowchart illustrating a flow of a DSVOL expansion process.

The DSVOL expansion process is executed in response to the DSVOL expansion processing request issued in S1505.

The processor 24 refers to the performance management table 206 (S1601) and determines whether the number of DSVOLs 55 corresponding to the snapshot group is less than a target number (S1602). When a determination result of S1602 is positive (Yes in S1602), the processor 24 newly produces the DSVOL 1000D for the snapshot group (S1603). That is, the number of DSVOLs 1000D is increased. The number of newly produced DSVOLs 1000D is equal to or greater than a difference between the original number of DSVOLS and the target number. For example, when the original number of DSVOLs is one and the target number is three, two or more DSVOLs 1000D are newly produced.

When a determination result of S1602 is negative (No in S1602), the processor 24 updates the performance management table 206 (for example, the expected inflow amount 54 and the number of DSVOLS 55) (S1604). The processor 24 updates the VOL management table 205 (for example, the DSVOL ID 49 of each VOL in the snapshot group) (S1605).

A detailed example of S1602 is as follows. That is, the "target number" means the number of DSVOLs of which expansion is unnecessary in the determination of S1504 of FIG. 15. For example, when the number of DSVOLs is set to K (where K is an integer of 2 or more) and the total inflow amount 53 is equal to or less than the expected inflow amount 54 (in other words, when the number of DSVOLs is less than K and the total inflow amount 53 remains to exceed than the expected inflow amount 54), K is the target number. The processor 24 determines the newly increased number of DSVOLS 1000D and produces the determined number of DSVOLs 1000D based on a difference between the number of DSVOLS 55 and the target number. Accordingly, it is possible to increase an appropriate number of DSVOLS 1000D.

According to a first entry exemplified in FIG. 5, since the expected inflow amount 54 complying with the number of DSVOLS 55 of "1" with respect to the total inflow amount 53 of "210 MB/s" is "150 MB/s," the number of DSVOLS of which the expansion is unnecessary in S1504 is two (the expected inflow amount of 300 MB/s with respect to an inflow amount of 210 MB/s). Therefore, one DSVOL 1000D is newly produced. In the DSVOL 1000D, data has not yet been stored. Therefore, for distribution allocation (equalization), S1509 (the DSVOL serving as a source of a region which can newly be allocated) may be focused on one newly produced DSVOL. Since an expected inflow amount of one DSVOL 1000D is 150 MB/s, write of 210 MB/s cannot be taken by one DSVOL 1000D. As a method of avoiding this, a method of equally storing data in two DSVOLS 1000D including the one newly produced DSVOL 1000D is considered. However, if so, the data is not equal between the DSVOLS 1000D.

Accordingly, the number of newly produced DSVOLS is considered to be a number larger than a difference between a current number of DSVOLs and the target number K. For example, the number of newly produced DSVOLS may be determined based on the current number of DSVOLs and the difference between the current number of DSVOLS and the target number K. Specifically, for example, P (the number of newly produced DSVOLs) is an L multiple (a value of L is value of 1 or more) of a difference D between C (the current number of DSVOLs) and K (the target number) and a value of L may be determined based on C. For example, when C=1, K=2, and D=1 are set, L=4 is obtained. Therefore, P=D*L=1*4=4 may be obtained. For example, when C=4, K=6, and D=2 are set, L=4 (or 8) is obtained. Therefore, P=D*L=2*4 (or 8)=8 (or 16) may be obtained. The increased number of DSVOLs is a number in which an inflow amount to any DSVOL 1000D in the snapshot group is kept equal to or less than an expected inflow amount of the DSVOL.

The processor 24 may set a storage destination of some data to the DSVOL 1000D before the expansion (existing) in S1508. That is, the processor 24 may set some (for example, x %) of sources of the allocated regions (the logical addresses) to the DSVOLs 1000D before expansion and may set the remains (for example, (100−x) %) of the sources of the allocated regions (the logical addresses) to the newly produced DSVOLS 1000D. That is, after the number of DSVOLS 1000D is increased in the snapshot group, the processor 24 may control an amount of data of which storage destinations are the DSVOLs before expansion (the DSVOLs 1000D existing before the increase in the number of DSVOLS 1000D) and an amount of data of which storage destinations are the expanded DSVOLs 1000D (the newly increased number of DSVOLS 1000D) (this control may be control in which an inflow amount to one DSVOL is kept equal to or less than an expected inflow amount of the one DSVOL). Accordingly, compatibility between prevention of deterioration in the I/O performance of the PVOL 1000P and the SVOL 1000S and saving of resources based on the DSVOLS 1000D can be expected. In this way, the processor 24 may distribute an allocation amount (a capacity of allocated regions) in the DSVOLS 1000D before expansion and the expanded DSVOLs 1000D (the newly produced) in a case in which there is an upper limit on the number of DSVOLs in the snapshot group due to restriction on resources based on the DSVOLS 1000D (for example, a capacity of the memory 25) or other reasons. Accordingly, prevention of deterioration in the I/O performance of the PVOL 1000P and the SVOL 1000S in the restricted resources can be expected.

The embodiment has been described above. However, the embodiment is an example given to describe the invention and the scope of the invention is not limited to the embodiment. The invention can be embodied in various forms. For example, the plurality of storage controllers 22 may be a plurality of storage nodes in a storage system configured by a plurality of storage nodes (for example, a plurality of general-purpose computers).

Figure 17:
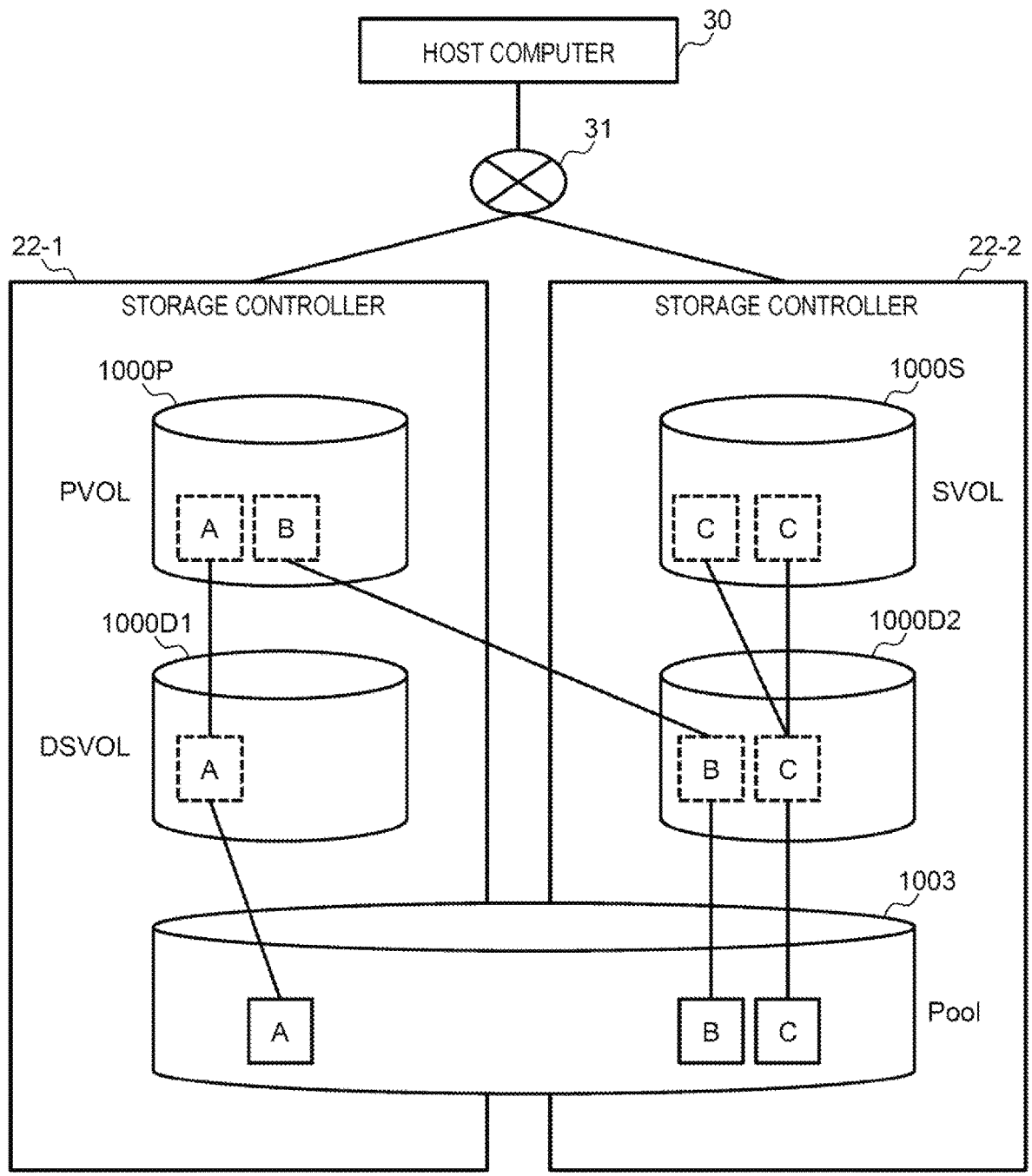
FIG. 17 is a diagram illustrating an overview of a storage system according to a modification.

As illustrated in FIG. 17, for each of the plurality of DSVOLs 1000D, an ownership (I/O right) of the DSVOL 1000D may be allocated to any of the plurality of storage controllers 22. Each storage controller 22 can execute I/O on the DSVOL 1000D in which the storage controller 22 has the I/O wright, but the storage controller 22 may not be able to execute I/O on the DSVOL 1000D in which the storage controller 22 does not have the I/O right. That is, the I/O rights of the plurality of DSVOLs 1000D are distributed to the plurality of storage controllers 22. Therefore, load distribution of the storage controllers 22 is expected. For example, since the storage controller 22 that has the I/O right stored in the DSVOL 1000D2 is the storage controller 22-2, the storage controller 22-1 transfers the data B to the storage controller 22-2 and the storage controller 22-2 stores the data B in the DSVOL 1000D2. Information indicating which storage controller 22 has the I/O right of a certain DSVOL may be stored in, for example, the VOL management table 205 or may be kept by each storage controller 22. When the DSVOL 1000D is newly produced, the I/O right of the DSVOL 1000D may be determined by any storage controller 22 so that the I/O rights of the plurality of DSVOLS 1000D are equal among the plurality of storage controllers 22.

What is claimed is:

1. A storage system comprising:
   a processor configured to produce a secondary volume (SVOL) which is a snapshot of a primary volume (PVOL),
   wherein a data store volume (DSVOL) for a snapshot group which is a group of the PVOL and one or more SVOLs for the PVOL is a data storage region where data of which a storage destination is one volume (VOL) of the snapshot group and meta-information of the data are stored, and the meta-information is information including address mapping between a reference source address which is an address of a position of the data in the snapshot group and a reference destination address which is an address of a position of the data in the DSVOL,
   wherein the processor executes I/O for updating the meta-information of data in a write process which is a process of a write request for updating the data in one VOL of the snapshot group with respect to the DSVOL storing meta-information, and
   wherein the processor
      determines whether an input/output (I/O) load on the snapshot group exceeds a threshold, and
      increases the number of DSVOLs for the snapshot group when a determination result is positive.

2. The storage system according to claim 1, wherein the processor equalizes amounts of data stored in a plurality of DSVOLS for the snapshot group.

3. The storage system according to claim 2, wherein, in a process of a write request for one VOL of the snapshot group, the processor selects a DSVOL of a storage destination of a write target data which is data incidental to the write request and stores the write target data in the selected DSVOL so that the amounts of data stored in the plurality of DSVOLs are equalized.

4. The storage system according to claim 2,
   wherein the equalization of the amounts of the data stored in the plurality of DSVOLs includes movement of data between the DSVOLs, and
   wherein the processor executes asynchronously the equalization with the process of a I/O request for one VOL of the snapshot group.

5. The storage system according to claim 1, wherein, after the number of DSVOL is increased for the snapshot group, the processor controls an amount of data of which a storage destination is a DSVOL existing before the increase in the number of DSVOLs and an amount of data of which a storage destination is a newly increased number of DSVOLS.

6. The storage system according to claim 5, wherein, when there is an upper limit in the number of DSVOLs for the snapshot group, the processor controls an amount of data of which a storage destination is a DSVOL existing before the increase in the number of DSVOLs and an amount of data of which a storage destination is a newly increased number of DSVOLS.

7. The storage system according to claim 1, wherein the case in which the input/output load on the snapshot group exceeds the threshold corresponds to one or both of:
   a case in which a sum of I/O loads on all VOLs in the snapshot group exceeds an I/O load threshold determined for the snapshot group; and
   a case in which for each of N or more DSVOLs (where N is a natural number) among all the DSVOLs allocated to the snapshot group, an I/O load of the DSVOL exceeds expected I/O performance of the DSVOL.

8. The storage system according to claim 7, wherein the I/O load threshold determined for the snapshot group is a product of I/O performance expected in one DSVOL and a current number of DSVOLs which is the number of DSVOL allocated to the snapshot group or a value less than the product.

9. The storage system according to claim 1,
   wherein the processor determines a newly increased number of DSVOLs based on a difference between a target number and a current number of DSVOLs in the snapshot group,
   wherein the current number of DSVOLs is the number of DSVOL allocated to the snapshot group, and
   wherein the target number is the number of DSVOLS of which an I/O load on the snapshot group is equal to or less than the threshold.

10. The storage system according to claim 9, wherein the newly increased number of DSVOLs is a number which is based on the difference and the current number of DSVOLS and is greater than the difference.

11. The storage system according to claim 10, wherein the newly increased number of DSVOLs is a number in which an I/O load on one DSVOL in the snapshot group is kept equal to or less than an expected I/O performance of the DSVOL.

12. The storage system according to claim 1, further comprising:
   a plurality of storage controllers,
   wherein each of the plurality of storage controllers includes the processor,
   wherein an I/O right of the plurality of DSVOLs in the snapshot group is distributed, and
   wherein each of the plurality of storage controllers stores data in the DSVOL for which the storage controller has the I/O right, and
   transfers the data to the storage controller having the I/O right when the storage controller does not have the I/O right of the DSVOL serving as a storage destination of the data.

13. A storage control method of a storage system producing a secondary volume (SVOL) which is a snapshot of a primary volume (PVOL),
   wherein a data store volume (DSVOL) for a snapshot group which is a group of the PVOL and one or more SVOLs for the PVOL is a data storage region where data of which a storage destination is one volume (VOL) of the snapshot group and meta-information of the data are stored, and the meta-information is information including address mapping between a reference source address which is an address of a position of the data in the snapshot group and a reference destination address which is an address of a position of the data in the DSVOL,
   wherein the storage system executes I/O for updating the meta-information of data in a write process which is a process of a write request for updating the data in one VOL of the snapshot group with respect to the DSVOL storing meta-information, and
   wherein the storage control method comprises:
      determining whether an input/output (I/O) load on the snapshot group exceeds a threshold, and
      increasing the number of DSVOLS for the snapshot group when the determination result is positive.

* * * * *